UNITED STATES PATENT OFFICE 1,994,196

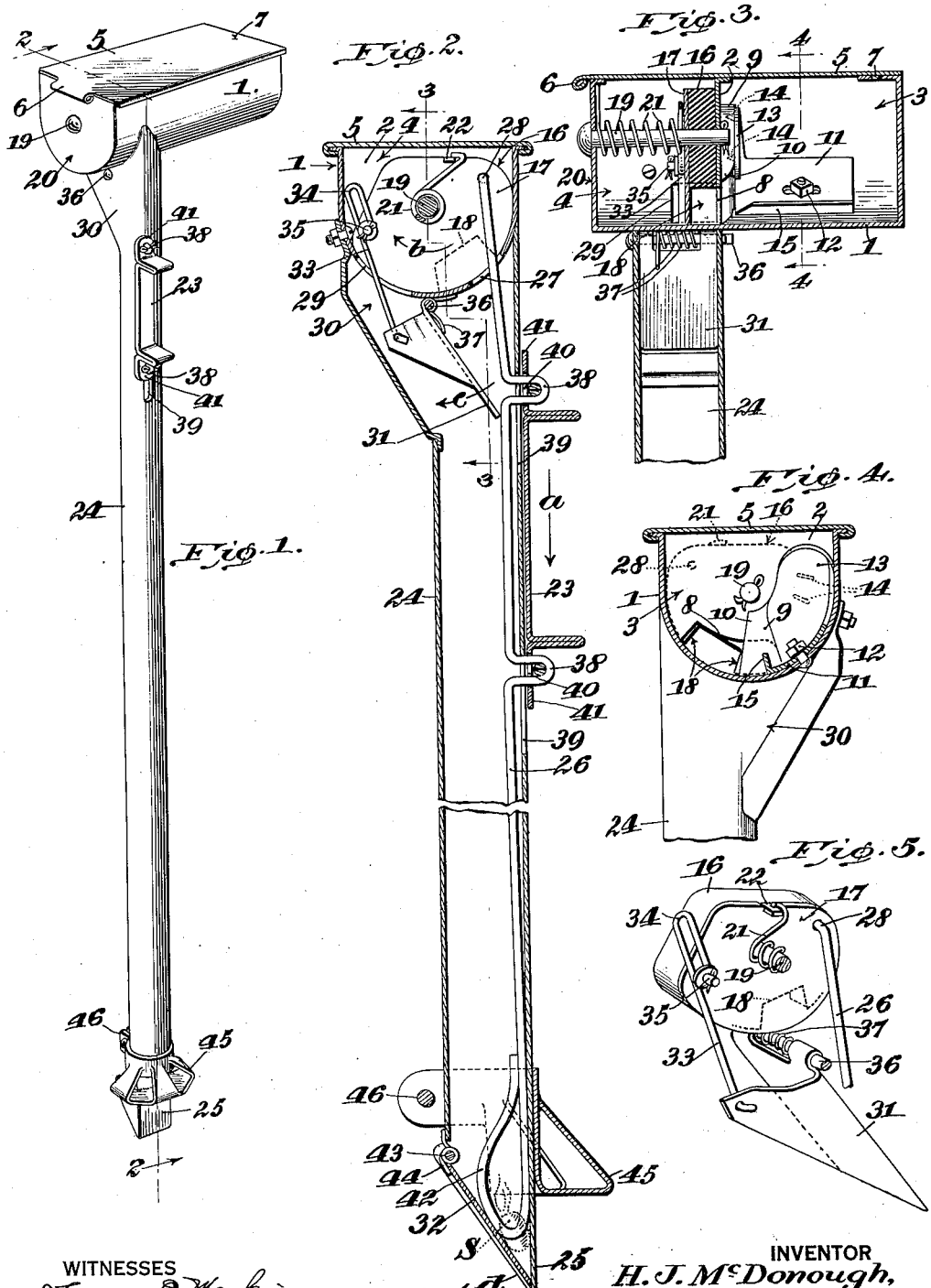

SEED PLANTER

Henry J. McDonough, Modena, Wis.

Application October 23, 1933, Serial No. 694,868

10 Claims. (Cl. 111—96)

This invention relates to improvements in seed planters, and its objects are as follows:—

First, to provide a hand-operated planter for sprouted seeds, which planter has a special rubber or other soft-material gate construction which will not injure the sprouts or crush the kernels.

Second, to combine a cut-off disc and gauge in said gate construction, said disc and gauge being composed of rubber for the purpose stated.

Third, to set the gauge for various sizes and shapes of seeds, the means for doing the setting comprising an adjustable slide member which has a degree of spring tension to insure its grip on the rubber substance of the gauge.

Fourth, to so embody the operating handle with the discharge tube as to enable working the seed gate on the hopper as well as other parts of the planter with the natural motion of thrusting the point into the ground.

Fifth, to provide a seeder with which empty places in the row can be filled out with sprouted seeds from a position of the riding cultivator.

In the drawing,

Figure 1 is a perspective view of the improved seed planter.

Figure 2 is a central section taken on the line 2—2 of Figure 1.

Figure 3 is a detail vertical section taken on the line 3—3 of Figure 2.

Figure 4 is a cross section taken on the line 4—4 of Figure 3.

Figure 5 is a detail perspective view of the cut-off disc and its connected trap door.

The improved seed planter is particularly intended for planting sprouted seed corn. However, its use is not confined to that purpose because other kinds of seeds may be planted by it, there being a gauge which can be set for various sizes and shapes of seeds.

At the top of the planter there is a hopper 1 which is divided crosswise by a partition 2 (Fig. 3) to provide storage and discharge compartments 3, 4. Upon sliding the cover 5 back a little way the compartment 3 can be loaded with seeds. This cover has a finger-piece 6 by which it is conveniently pulled and pushed, and a snap arrangement 7 which removably holds the cover in place.

An opening 8 in the substantial bottom of the partition 2 provides for the passage of seeds one by one from the compartment 3 to the compartment 4. The size of the opening is adjustable by a gauge 9. This is made of rubber or other suitable soft material, and lies against the partition 2 on the side of the compartment 3. Its end next to the opening 8 is feathered at 10, the rounding or bevelling which produces the feather making the end flexible enough so that the likelihood of injury to the kernels or sprouts in passing through the opening 8 is reduced to a minimum.

The gauge 9 is backed up by a slide member 11 which is adjustable longitudinally of the compartment 3 as at 12. The slide member has an upstanding plate 13 with at least two prongs 14 on the side next to the gauge 9 to impale the gauge. The principle of adjustment is to loosen up at 12, move the slide member 11 to the right, disengage the gauge 9 from the prongs 14 and set the gauge to a new position with respect to the opening 8. The new position should either enlarge or reduce the adjustable part of the opening as may be desired.

Thereafter the slide 11 is moved back so that the prongs 14 grip a new place on the gauge 9, whereupon the adjustment 12 is again tightened. The upstanding plate 13 has a degree of resiliency, and this insures its grip on the gauge 9 and would insure a grip even though the prongs 14 were broken off. A flange 15 along the lower side of the slide member 11 both reinforces said member and aids in directing the seeds toward the opening 18.

On the other side of the partition 2 there is a cut-off member consisting of a disc 16 also made of rubber or other soft material, backed up by a metal plate 17. The disc 16 is cut out in one place to provide a seed pocket 18. This pocket normally communicates with the opening 8, but is closed on the side of the discharge compartment 4 by the metal backing 17 which extends down over it (Figs. 2, 3 and 5). The gauge 9 and cut-off member are herein known as a gate construction inasmuch as they coact with the opening 8 in the discharge of seeds from the hopper compartment 3.

In addition to its backing function the plate 17 also provides a stiff mount for the rubber disc 16 on a shaft 19. The plate is preferably secured to the shaft so that the shaft turns when the plate is turned. The ends of the shaft have bearing in the partition 2 and in the adjacent end 20 of the hopper 1. It carries a coiled spring 21 which tends to turn the disc 16 to the normal position which is herein regarded as that position in which the seed pocket 18 communicates with the opening 8. The ends of the spring are hooked against a projection 22 on the plate 17 (Fig. 5) and against a flange on the end 20.

Turning motion for the discharge of seeds is caused by pushing downwardly on an operating handle 23 (Figs. 1 and 2). This handle is gripped simultaneously with gripping the upper end of the discharge tube 24 by which the seeds are directed to a hole in the ground. This hole is made by the ground-penetrating end of the tube shown in the form of a point 25 when wielding the planter somewhat on the order of a person going along with a walking stick and pushing the pointed end into the ground a short distance at intervals.

The handle 23 is connected with a rod or wire 26, most of which is confined to the inside of the tube 24. The upper end of it goes through a hole 27 (Fig. 2) in the bottom of the compartment 4 and is bent at right angles at 28 (Fig. 5) to make a crank connection with the cut-off disc 16 and its metal backing 17. A downward push of the handle 23 (arrow a) in the natural motion of wielding the planter is imparted to the rod 26 which turns the cut-off disc in the clockwise direction (arrow b, Fig. 2). The clockwise turning of the cut-off disc in Figure 2 would be a counter-clockwise turning of it in Figure 4, and imagining a seed to have entered the pocket 18 it is readily seen that the seed will be carried to one side of the discharge compartment to be dropped through an opening 29.

This opening communicates with a seed trap 30. This comprises a throat at the upper end of the tube 24. It includes a trap door 31 which is normally open. This door coacts with a release door 32 at the lower end of the tube. This door is normally closed so that a seed S (Fig. 2) discharged by the opening of the door 31 will be entrapped adjacent to the point 25 in readiness for the next planting.

A link 33 connects the cut-off disc 16 with the trap door 31. This link is looped at 34 to receive a pin 35 projecting from the cut-off disc. A pivot pin 36 turnably supports the trap door 31 in the trap 30. A spring 37 wound on part of this pin is so applied as to always tend to turn the door 31 clockwise (arrow c, Fig. 2) into a closing position against the bottom of the trap 30.

It is prevented from normally assuming that position because of its being checked by the engagement of the bottom of the loop 34 with the pin 35. When the disc 16 of the gate construction 9, 16 is turned clockwise to a seed-releasing position (arrow b, Fig. 2) the pin 35 tends to slip upwardly in the loop 34, whereupon the door 31 follows in the closing position by virtue of the spring pressure behind it. The link 33, loop 34 and pin 35 therefore constitute slip-check means first preventing the tendency of the door 31 to close, next yielding to the spring 37. If the door 31 should stick in the open position (Fig. 2), the planter can be worked nevertheless because the pin 35 would simply ride upwardly in the loop 34 without any response on the part of the door 31.

Two places 38 are bent outwardly from the wire 26 through slots 39 in the tube 24 and are passed through openings 40 in the end lips 41 of the handle 23. Cotter pins are put through the bent places to complete the connection. The lower end of the wire is bent into a large eye 42. This has a cam action against the release door 32 to turn the latter on its hinge 43 against the tension of a spring 44. A gauge 45, clamped onto the tube 24 at 46 a short distance above the point 25, tends to limit the insertion of the point into the ground.

The operation is readily understood. Assuming the operator to be right-handed he will grasp the discharge tube 24 so that the palm of the right hand engages the operating handle 23, the fingers and thumb being closed around the far side. The hopper 1 will be held between the arm and the right side of the body, and when held in that position the storage compartment 3 will slant upwardly and so cause the seeds to gravitate toward the opening 8. As vacant places are spotted in the row the operator will push the point 25 into the ground until limited by the gauge 45, the act of pushing causing the handle 23 to slide downwardly (arrow a, Fig. 2). This turns the cut-off disc 16 clockwise (arrow b, Fig. 2), closes the trap door 31 (arrow c) and opens the release door 32 (arrow d).

The seed S previously deposited at the bottom of the tube 24 is discharged into the hole in the ground formed partly by the point 25 and the opening and displacing action of the door 32. A seed discharged from the pocket 18 by the action of the cut-off disc 16 is caught and temporarily intercepted in the seed trap 30 by the now closed door 31. When the planter is again lifted from the ground all of the parts naturally return to their normal positions by virtue of the various spring actions, the seed temporarily entrapped at 30 then falling to the bottom of the tube where it is held by the door 32 in readiness for the next operation.

Should the trap door 31 get out of order by sticking in the open position the planter could be worked nevertheless, in that case each seed as discharged by the pocket 18 will fall directly to the bottom of the tube 24 and into the hole in the ground because of the release door 32 being open. The door 32 opens simultaneously with the registration of the pocket 18 with the discharge opening 29. The trap door 31 also closes the trap 30 simultaneously with the foregoing action to temporarily intercept the seed.

Mention has been made of the possibility of the door 31 becoming disordered. This is a remote possibility, but in case of a breakage or a clogging of the trap 30, the back wall 47 is made in the form of a removable plate which is hooked in at 48 and secured by a single bolt and nut 49.

I claim:—

1. A seed planter comprising a seed storage compartment and a discharge tube having a ground-penetrating end, a gate construction to control the passage of seeds from the compartment to the tube said construction including a cut-off member, means comprising a trap and including a trap door between the compartment and tube, means tending to close the trap door, and slip-check means between the trap door and gate construction preventing said tendency while the cut-off member is in one position, and means by which to move the cut-off member to a seed-releasing position, thereby making the slip-check means yield to the trap door closing means when pushing the tube end into the ground and at the same time permitting the trap door to close to intercept the seed.

2. A seed planter comprising a seed storage compartment and a discharge tube having a point, means comprising a trap and including a trap door between the compartment and the tube, a gate construction to control the passage of seed from the compartment into the trap, a release door at the point, and means operable simultaneously with pushing the point into the ground to cause simultaneous operation of the gate construction, the trap door and the release door.

3. A seed planter comprising a seed storage compartment and a discharge tube having a point, means comprising a trap between the compartment and tube, said trap including a trap door which has means tending to close it, a gate construction to control the passage of seeds from the compartment to the trap, said construction including a cut-off member, and means coupled with said member holding the trap door open, a release door at the point and means holding it closed, and means operable simultaneously with pushing the point into the ground causing operation of said member and a reversal of position of the doors.

4. A seed planter comprising a hopper, a partition dividing the hopper into seed storage and discharge compartments, said partition having an opening, a discharge tube in communication with the discharge compartment, a disc of soft material in the discharge compartment having a pocket registrable with the opening, means to movably support the disc comprising a shaft mounted in the discharge compartment and a metal backing plate on the side of the disc remote from the partition providing an outside closure for the pocket, and means to move the disc for the discharge of an entrapped seed in its pocket to the tube, said means including a wire with a crank end attached to the backing plate.

5. A seed planter comprising a hopper, a dividing partition with a seed opening, a cut-off disc of soft material on one side of the partition and having a seed pocket registrable with the opening, a backing plate on the side of the disc remote from the partition closing that side of the pocket, means to movably support the disc upon the partition, means comprising a trap communicable with the pocket and including a movable door, actuating means to turn the disc and register the pocket with the trap, and means by which motion of the trap door follows the turning of the disc, one of the last two means being connected with the backing plate.

6. A seed planter comprising a hopper, an attached discharge tube having at least one slot, a gate construction by which the discharge of seeds is controlled from the hopper into the tube, said construction including a cut-off member, means by which said member is operated in the motion of pushing an end of the tube into the ground, said means comprising a rod attached to a part of the member and provided with a bent place extending through the slot, and a handle attached to said bent place being grasped in wielding the planter and thereby slidable on the outside of the tube.

7. In a seed planter having a hopper containing a partition with an opening, a gauge on one side of the partition to regulate the size of the opening, means impaling the gauge to set its adjusted positions, and means by which the impaling means is adjustably attached to the hopper.

8. A seed planter comprising a hopper, a partition in the hopper having an opening, a pocketed cut-off disc on one side of the partition, a soft rubber gauge on the other side of the partition, a slide and means by which it can be adjusted to enable setting the gauge with respect to the opening, and an upstanding plate on the slide bearing against the gauge and having prongs to impale it.

9. A planter for sprouted seed comprising a hopper, a partition having a seed opening, means on one side of the partition to take away single seeds admitted through the opening, and a gauge on the other side of the partition to adjust one dimension of the opening, said gauge being made of soft material and having a feathered end adjacent to the opening to insure flexibility.

10. A seed planter comprising a tube having a seed hopper at one end and adapted to have its other end penetrate the ground, a handle located on the side of the tube and means by which it is slidably attached to the tube so as to slide up and down along the tube when wielding the planter, a gate construction situated between the hopper and the tube, said construction including a cut-off member, and a connection between the handle and said member working the latter to periodically release seeds as the handle is slid.

HENRY J. McDONOUGH.